(12) United States Patent
Poole et al.

(10) Patent No.: US 11,606,917 B2
(45) Date of Patent: Mar. 21, 2023

(54) BATTERY-POWERED BACKPACK BLOWER

(71) Applicant: BLACK & DECKER, INC., Newark, DE (US)

(72) Inventors: Brian Poole, Lutherville, MD (US); Joshua M Sheffer, Dover, PA (US); Wong Kun Ng, Cockeysville, MD (US); Keith D. Flaharty, Wrightsville, PA (US); Joseph B. Cooper, Baltimore, MD (US); Philip Martinez, New Cumberland, PA (US); David Keith Wheeler, Gananoque (CA); Christopher Wade Shook, Bel Air, MD (US)

(73) Assignee: Black & Decker, Inc., New Britain, CT (US)

(*) Notice: Subject to any disclaimer, the term of this patent is extended or adjusted under 35 U.S.C. 154(b) by 293 days.

(21) Appl. No.: 16/845,149

(22) Filed: Apr. 10, 2020

(65) Prior Publication Data

US 2020/0236875 A1 Jul. 30, 2020

Related U.S. Application Data

(63) Continuation of application No. 15/877,896, filed on Jan. 23, 2018, now Pat. No. 10,645,884, which is a continuation of application No. 14/748,559, filed on Jun. 24, 2015, now Pat. No. 9,907,234.

(60) Provisional application No. 62/082,178, filed on Nov. 20, 2014.

(51) Int. Cl.
*A01G 20/43* (2018.01)
*A47L 5/14* (2006.01)
*A01G 20/47* (2018.01)

(52) U.S. Cl.
CPC ............. *A01G 20/47* (2018.02); *A47L 5/14* (2013.01)

(58) Field of Classification Search
CPC ........... A01G 20/43; A01G 20/47; A47L 5/14
See application file for complete search history.

(56) References Cited

U.S. PATENT DOCUMENTS

| | | | | |
|---|---|---|---|---|
| 6,006,400 A * | 12/1999 | Presenza | ................ | A47L 5/36 15/327.5 |
| 6,105,206 A * | 8/2000 | Tokumaru | ............. | F04D 19/002 15/410 |
| 6,305,048 B1 * | 10/2001 | Salisian | ................ | A47L 9/322 15/327.5 |
| 7,231,777 B1 * | 6/2007 | Arnold | ................ | F24F 1/022 62/259.3 |
| 7,712,182 B2 * | 5/2010 | Zeiler | ................ | A47L 5/36 15/353 |

(Continued)

FOREIGN PATENT DOCUMENTS

| | | | | |
|---|---|---|---|---|
| WO | WO-2014119175 A1 * | 8/2014 | ............ | A01G 1/125 |
| WO | WO-2014119181 A1 * | 8/2014 | ......... | F04D 25/0673 |

*Primary Examiner* — Marc Carlson
(74) *Attorney, Agent, or Firm* — John Yun

(57) ABSTRACT

The battery-powered backpack blower includes a back support assembly including a back plate configured to permit a user to mount the blower to the user's back, and a volute assembly including a first volute portion and a second volute portion. The backpack blower further includes a housing assembly including a battery assembly and a motor assembly therein, the housing assembly is provided intermediate to the back assembly and the volute assembly.

10 Claims, 14 Drawing Sheets

(56) References Cited

U.S. PATENT DOCUMENTS

| | | | |
|---|---|---|---|
| 9,907,234 B2* | 3/2018 | Poole | A47L 5/14 |
| 10,202,786 B1* | 2/2019 | Keegan | A01G 18/60 |
| 2005/0055795 A1* | 3/2005 | Zeiler | H01M 50/20 |
| | | | 15/353 |
| 2007/0292749 A1* | 12/2007 | Coombs | H01M 50/256 |
| | | | 429/96 |
| 2009/0038108 A1* | 2/2009 | Shaanan | A47L 5/14 |
| | | | 15/246 |
| 2011/0197389 A1* | 8/2011 | Ota | B25F 5/00 |
| | | | 429/121 |
| 2012/0234412 A1* | 9/2012 | Prager | A01G 20/47 |
| | | | 137/565.01 |
| 2013/0164589 A1* | 6/2013 | Ota | H01M 50/574 |
| | | | 429/99 |
| 2014/0011061 A1* | 1/2014 | Yoshinari | H01M 50/20 |
| | | | 429/98 |
| 2015/0113758 A1* | 4/2015 | Nashimoto | A01G 20/47 |
| | | | 15/327.5 |
| 2015/0237808 A1* | 8/2015 | Prager | E01H 1/0809 |
| | | | 15/405 |
| 2016/0108924 A1* | 4/2016 | Conrad | F04D 25/0673 |
| | | | 417/423.7 |
| 2016/0198636 A1* | 7/2016 | Poole | A01G 20/47 |
| | | | 15/327.5 |
| 2019/0029191 A1* | 1/2019 | Poole | A47L 5/14 |
| 2020/0236875 A1* | 7/2020 | Poole | A47L 5/14 |

* cited by examiner

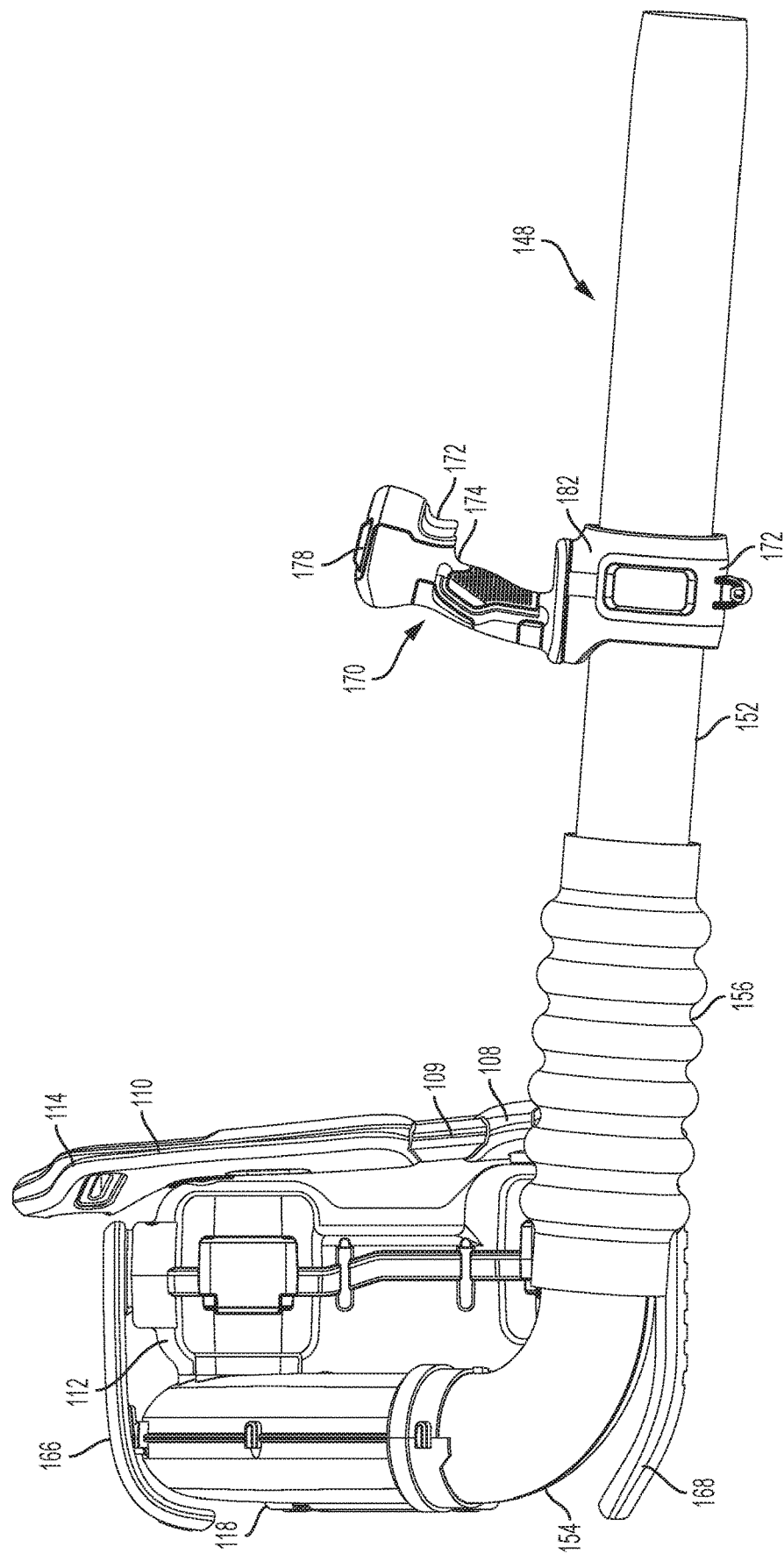

BATTERY-POWERED BACKPACK BLOWER

TECHNICAL FIELD

The present application is a continuation application of U.S. patent application Ser. No. 15/877,896 filed Jan. 23, 2018 and U.S. Pat. No. 9,907,234 granted Mar. 6, 2018, and claims the benefit of the filing date of expired U.S. provisional patent application No. 62/082,178 filed Nov. 20, 2014, which is hereby incorporated by reference for all purposes as if fully set forth herein.

BACKGROUND OF THE INVENTION

Blowers are generally used for cleaning and/or removing light objects from surfaces, such as blowing away fallen leaves, and/or light debris, for example. Conventional backpack or back mounted blowers generally include a back plate, which supports the blower's components on the user's back. Current gas-powered backpack blowers include an internal combustion engine and a blower section driven by the engine. One major disadvantage of gas-powered blowers is that during operation, gas-powered blowers have a propensity to release undesirable emissions into the environment. Additionally, because the gas-powered blowers require gas, they generally require the user maintain or store an extra supply of fuel for the engine and repeatedly refill the blower gas tank. This can not only be costly, but may also have a negative impact on the environment.

Most gas-powered blowers are configured with a volute and fan member positioned directly against the back of the user. In this configuration, the fan intake is often provided against the back of the user with the air entering from the sides. One disadvantage of positioning the fan air intake on the side of the blower is that the size of the air intake vent is relatively limited. The limited vent size limits the overall flow rate of air through the blower, and thus limits the blower's performance and efficiency.

Therefore, it would be desirable to have a backpack blower having an obstruction-free air intake to allow the free flow of air through the blower to increase its efficiency. This is even more important when considering backpack blower powered by a battery, which have a limited supply of energy. These batteries can be one of the heavier components in the blower, and so it is important to position the battery at an optimal position which reduces physical strain on the user during operation. To optimize the user's experience and reduce user fatigue during usage, it is important to balance the mass of the battery, and other heavier blower components, thus reducing the torque forces required by the user during operation.

SUMMARY OF THE INVENTION

In light of the present need for a battery-powered blower with a compact configuration, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

The battery-powered backpack blower includes a back support assembly including a back plate and a harness assembly configured to permit a user to mount the blower to the user's back. The backpack blower further includes a volute assembly configured to generate air flow through the backpack blower, which includes a fan member to generate air flow therethrough. The backpack blower further includes a housing assembly provided intermediate to the volute assembly and back support assembly. The housing assembly includes a first battery well configured to hold a battery. The motor assembly is secured to the housing assembly and operatively connected to the fan member.

In further embodiments, the backpack blower further includes a tube assembly operatively connected to the volute assembly via an elbow member, to receive airflow from the fan member at a first end and to blow air out of a second end.

In further various embodiments, the volute assembly has a rearward facing aperture defining an air inlet configured to permit air to flow to the fan member.

In further various embodiments, the battery-powered backpack blower further comprises a top guard plate member extending from a top portion of the housing assembly over a top portion of the volute assembly to provide protection to the volute assembly. A floor plate is connected to the back plate and configured to protect the housing assembly. Top guard plate member and floor plate extend beyond the volute assembly protect a back portion of the volute assembly.

In further various embodiments, the back plate assembly includes a top plate portion, a bottom plate portion, and a first intermediate member and second intermediate member connecting the top plate portion and bottom plate portion.

In further various embodiments, when a first battery is positioned in the first battery well of the backpack blower, the first battery is positioned generally centrally in the lateral direction to the backpack blower.

In further various embodiments, the lateral center of gravity of the blower is substantially midway between the sides of the blower.

In further various embodiments, the housing assembly includes a second battery well configured to further hold a second battery, wherein the first battery well is positioned generally above the second battery well. When the first and second batteries are positioned in the respective battery well, the first battery and second battery are positioned generally centrally in the lateral direction to the backpack blower.

In further various embodiments, the housing assembly of the backpack blower includes a motor chamber positioned between the first battery well and the second battery well. The first battery well and second battery well may each have openings formed on the same side of the housing assembly.

In further various embodiments, the backpack blower is configured such that when the backpack blower is resting in an upright position on a surface, the first battery well is further rearward than the second battery and when the backpack blower is secured to a user, the first battery well is positioned above the second battery well so as to be equidistant from the user's back.

BRIEF DESCRIPTION OF THE DRAWINGS

In order to better understand various exemplary embodiments, reference is made to the accompanying drawings, wherein:

FIG. 4A is a side view of the battery-powered backpack blower illustrating the tube member connected to a volute assembly;

DETAILED DESCRIPTION OF THE DRAWINGS

In view of the aforementioned battery-powered backpack blower configurations, it is desirable to provide a battery-powered backpack blower with a compact configuration having a balanced mass and center-of-gravity that distributes and reduces the weight applied to the user's body during usage. Placing the center of gravity of the battery-powered backpack blower lower and close to the user's back increases the user's comfort. It is further desirable to provide a battery-powered backpack blower with a volute assembly and a fan intake positioned at the rear of the blower to optimize air intake efficiency and overall blower performance during operation.

Further, it is desirable to provide a battery-powered backpack blower having a balanced compact configuration with a battery housing assembly and motor assembly positioned close to the user's back and between a volute assembly and back plate to further balance and distribute the mass of the battery and motor during operation.

For simplicity and illustrative purposes, the principles are shown by way of examples of systems and methods described. In the following description, numerous specific details are set forth in order to provide a thorough understanding of the embodiments It will be apparent however, to one of ordinary skill in the art, that the embodiments may be practiced without limitation to these specific details. In other instances, well known methods and structures are not described in detail so as not to unnecessarily obscure understanding of the examples.

Figure 1A:
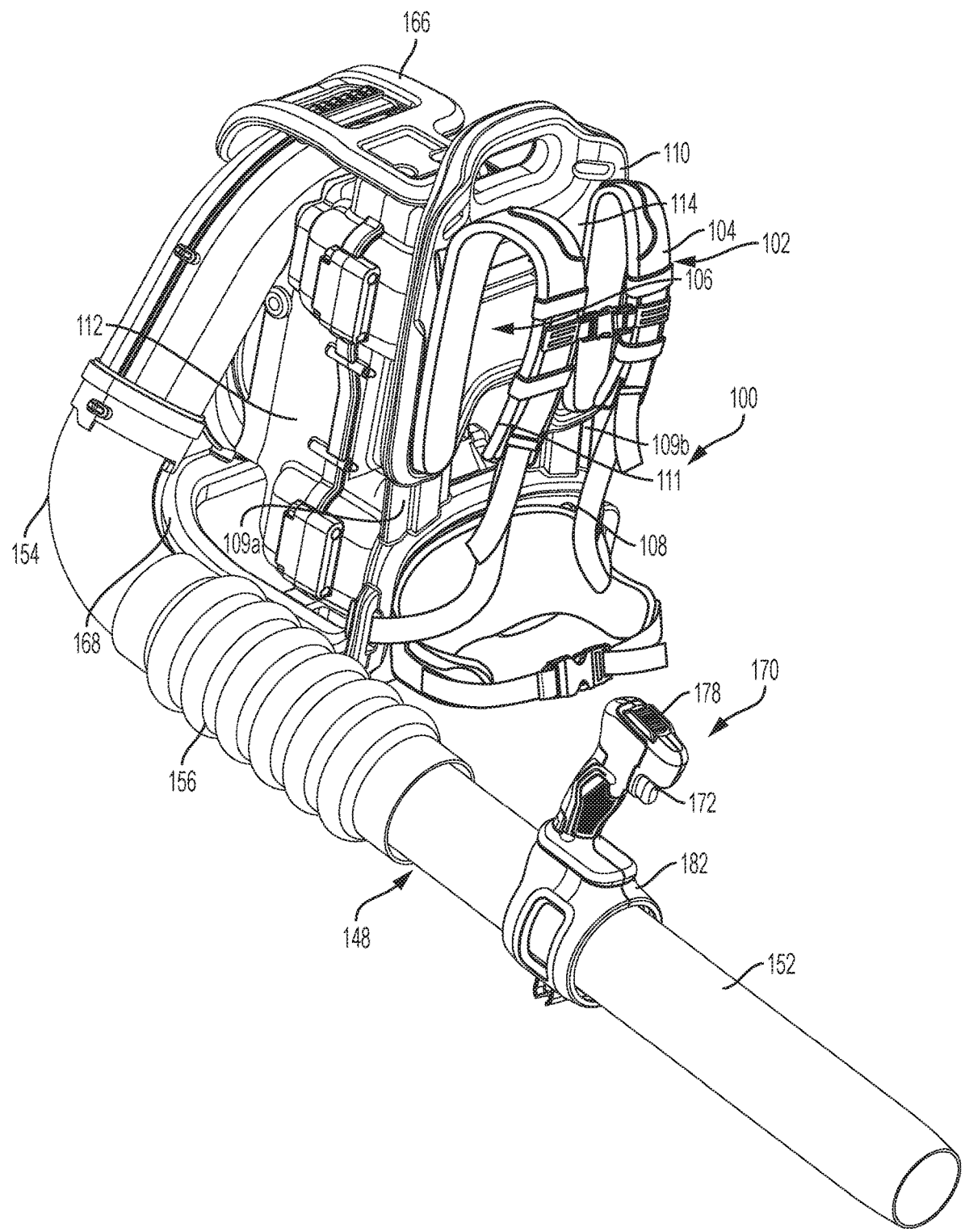
FIG. 1A. is a front perspective view of the battery-powered backpack blower.
Figure 1B:
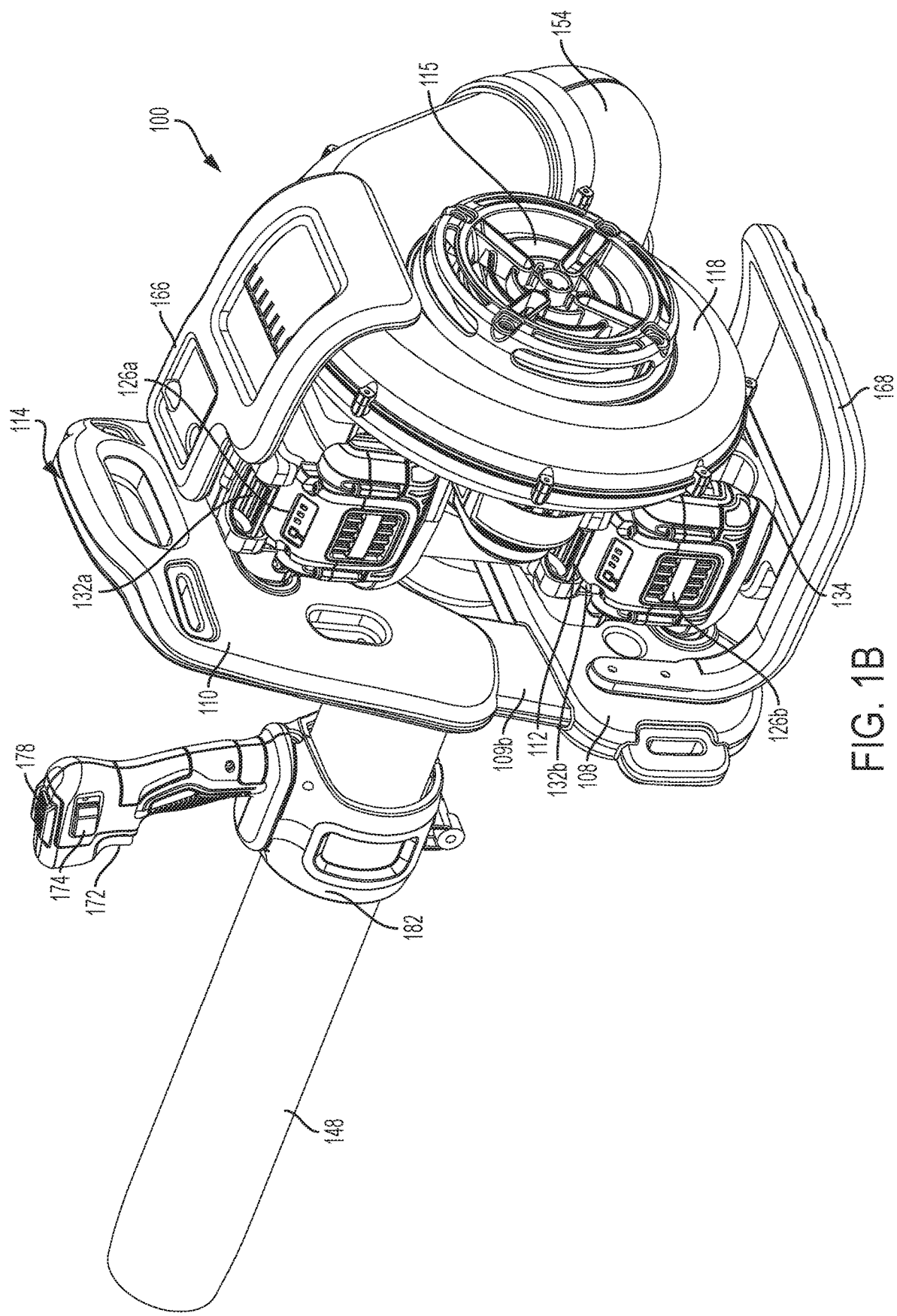
FIG. 1B is a rear perspective view of the battery-powered backpack blower.

Referring now to the drawings, wherein the illustrations are for purposes of describing one or more embodiments and not for the purposes of limiting the same, FIGS. 1A and 1B provide front and rear perspective views of an embodiment of the battery-powered backpack blower, generally designated by the reference numeral 100. The battery-powered backpack blower 100 generally a back support assembly 114 configured to mount the battery-powered backpack blower 100 on a user's back. The back support assembly includes a strap assembly 102 and a back plate member 106. The strap assembly 102 generally includes one or more straps 104, which extend generally about a frontal portion of the backpack blower 100 and are configured to engage the body and/or shoulders of a user, similar to that of a conventional backpack. The straps 104 may be adjustable, permitting a user to raise, lower, and/or tighten the position of the backpack blower 100 position on the user's back, thus permitting the battery-powered backpack blower to accommodate a variety of different sized users.

Figure 2:
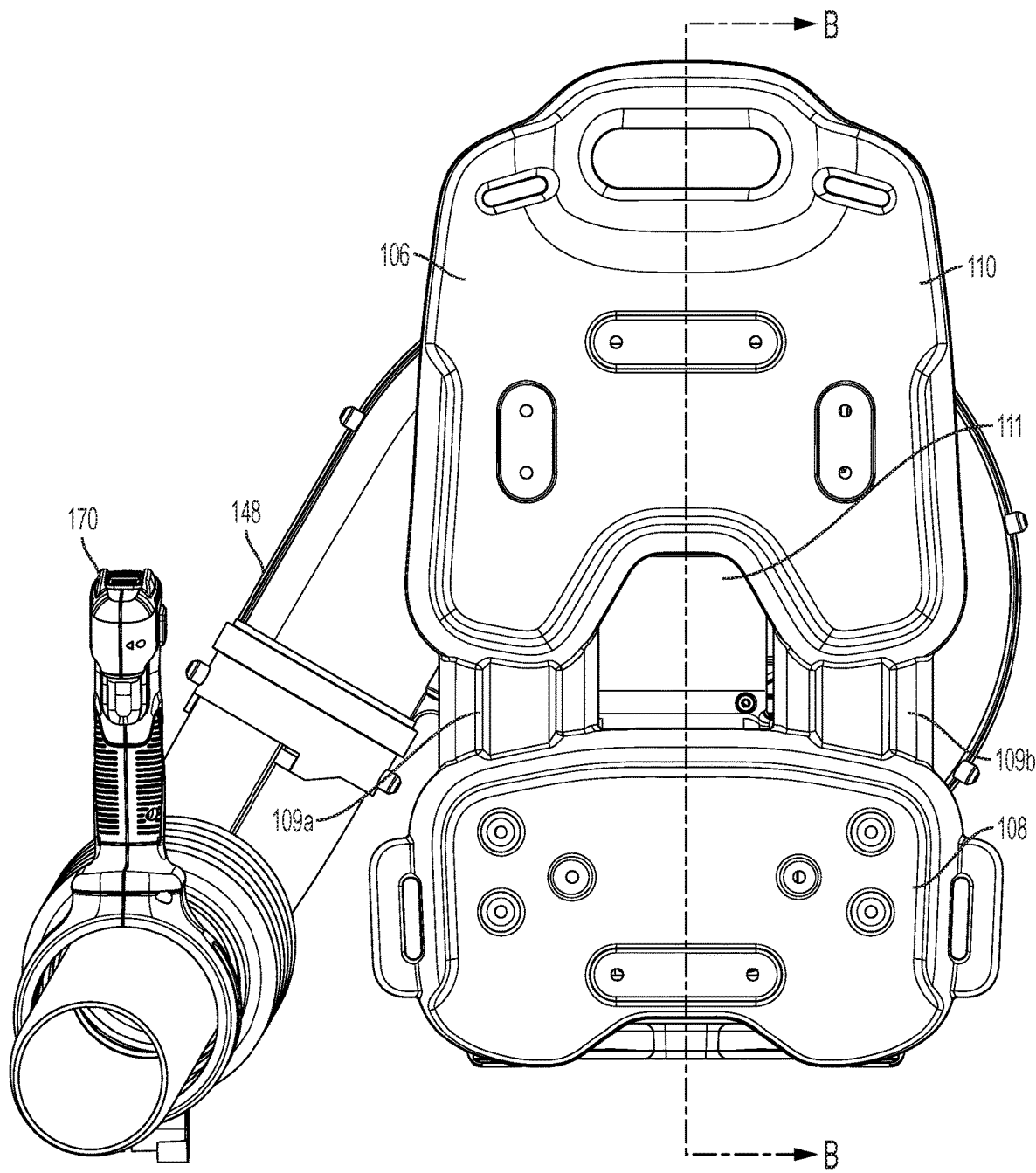
FIG. 2 is a front view of the battery-powered backpack blower.

As shown in FIGS. 1A-1B and FIG. 2, the back support assembly 114 further includes the strap assembly 102 and a back plate member 106 including an integrally formed top plate portion 110 configured for engagement with an upper part of the user's back, and a lower plate portion 108, configured for engagement with a lower part of the user's back. The back plate member 106 and respective plate portions 108, 110 may be ergonomically configured to absorb forces exerted on the user by the weight of the backpack blower. As illustrated, the top plate portion 110 and lower plate portion 108 may be connected by one or more intermediate members 109a and 109b. The intermediate members 109a and 109b extend generally between the top plate portion 110 and lower plate portion 108, thus providing additional stability to the back plate 106. The back plate member 106 may be formed from one piece, for example, by molding a plastic. A plastic back plate member, while being lightweight, would help provide structural rigidity to the blower and help shield the user's back from any heat and vibration.

As shown, an aperture 111 may be formed between the intermediate members 109a, and 109b to provide flexibility to the back plate member 106, as well as ventilation for air to flow between the back support assembly 114 and other components of the backpack blower 100. Additionally, the aperture 111 in the back plate member 106 reduces the weight and the overall cost of materials of the back plate member 106 may be reduced.

As illustrated in FIG. 1B, the backpack blower 100 further includes a volute assembly 118 configured to distribute air flow received from the environment through the battery-powered backpack blower 100. As depicted, the volute assembly 118 may be positioned generally at the rear portion of the battery-powered backpack blower 100, generally on the back outer surface. As such, air flows into the backpack blower 100 through the back of the backpack blower 100. Notably, it is contemplated that the volute-assembly 118 may also have a non-volute configuration, such as a blower assembly and/or other structures, which include a housing, fan, an opening and a motor, that are capable of generating and guiding airflow through the blower 100. An elbow member 154 is connected to the volute assembly 118, and configured to receive a tube member connection, which will be discussed later herein.

The battery-powered backpack blower 100 further includes a housing assembly 112, which may be positioned intermediate to the back support assembly 114 and the volute assembly 118. The housing assembly 112 is configured to contain components of the backpack blower 100 such as, one or more batteries and/or a motor assembly, for example. The housing assembly 112 is configured within the backpack blower 100 to position the battery and motor proximate to the user's back. By placing the relatively heavier components, such as the battery and the motor closer to the user's back the torque forces required for the user to rotate with the backpack blower 100 on his/her back are reduced. This reduces the overall energy required by the user to operate the battery-powered backpack blower 100. This configuration increases the user's comfort during operation. Additional details regarding the housing assembly 112 configuration and features, will be further described later herein.

Figure 3:
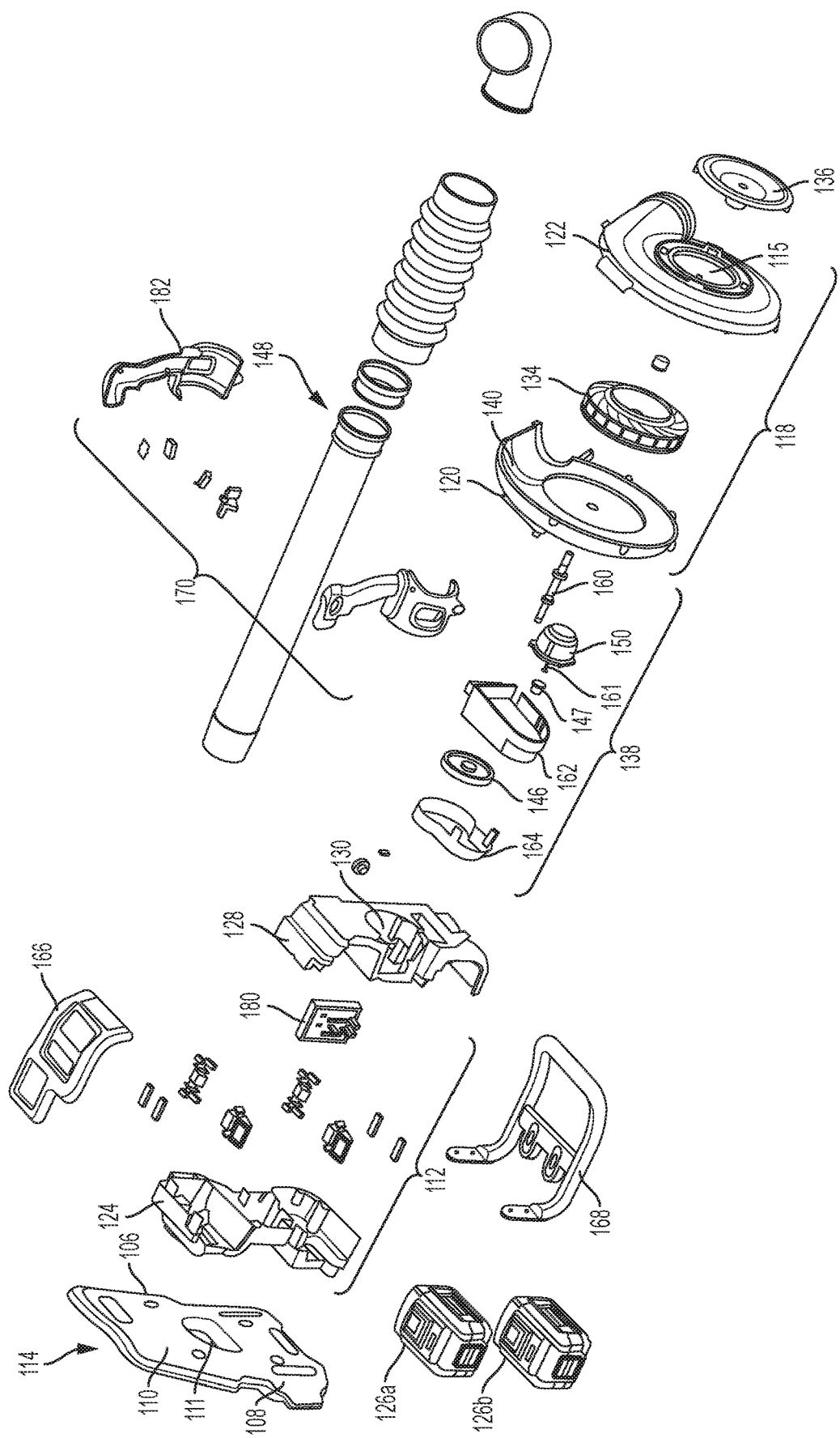
FIG. 3 is an exploded view of the battery-powered backpack blower.

FIG. 3 illustrates an exploded view of the battery-powered backpack blower 100. The volute assembly 118 generally includes a first volute portion 120 and a second volute portion 122, which are configured to cooperatively form a unitary structure. A fan member 134 is disposed centrally within the volute assembly 118 for generating air flow through the volute assembly 118.

The fan member 134 may be a radial fan, such that air that enters the volute assembly from the environment along an axis of the fan, and exits the fan in a radial direction. The second volute portion 122 includes one or more inlet openings 115 to facilitate air flow into the volute assembly 118. As such, the opening 115 is centrally located about the volute portion 122, at the rear of the battery-powered backpack blower 100. The fan member 134 is disposed in the volute assembly 118, proximate to the opening 115, which permits air to flow from the exterior of the backpack blower 100, through the opening 115 and fan member 134, and into the volute assembly 118 during operation.

Figure 5:
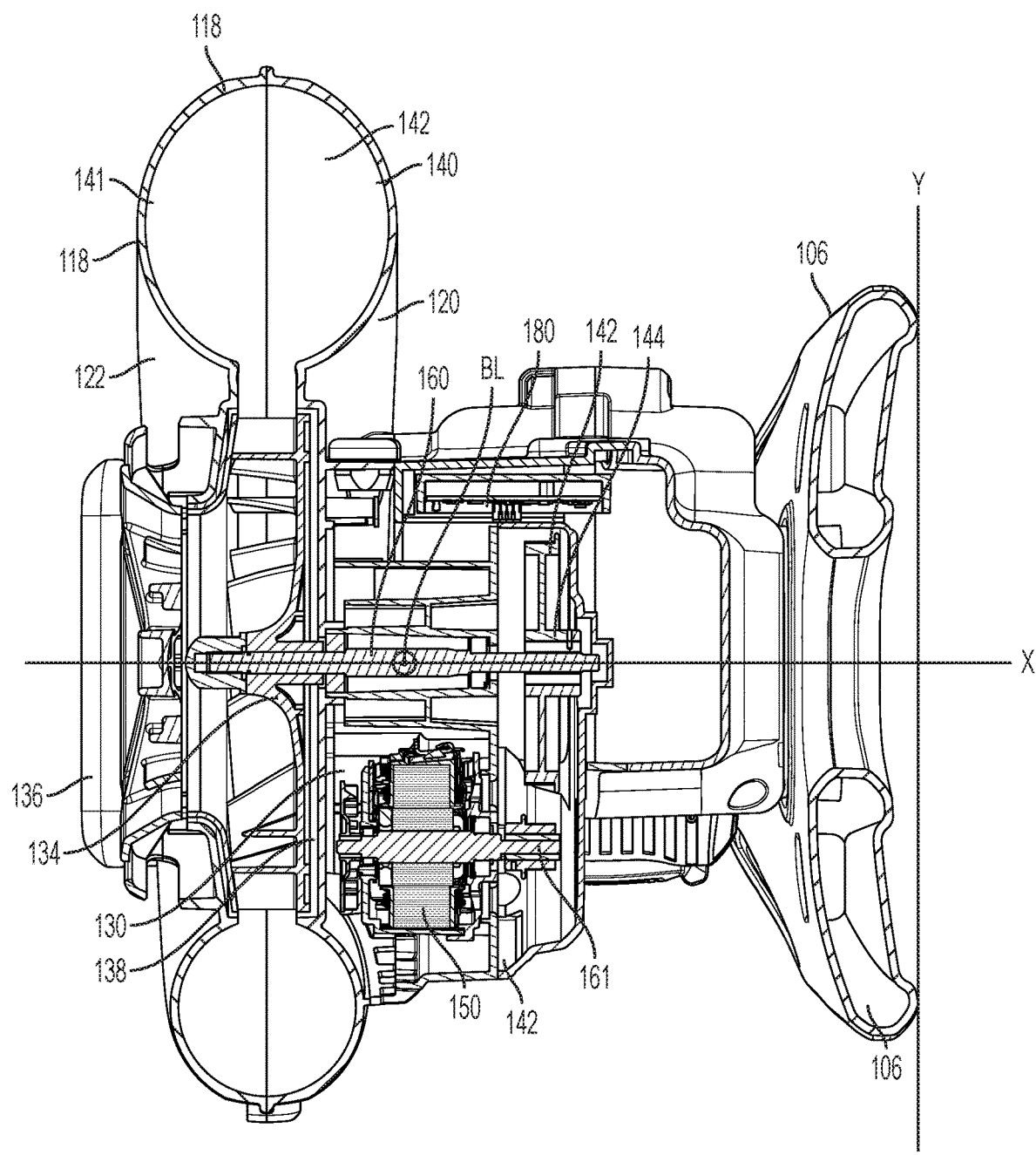
FIG. 5 is a top sectional view of the battery-powered backpack blower of FIG. 1, showing the longitudinal and lateral center of gravity of the blower.

As indicated in FIG. 5, the first volute portion 120 and second volute portion 122 each include respective interior surfaces 140, 141, which cooperatively define a chamber 142 for air generated by the fan member 134 to flow through. A cover 136, which may have a reticulated cover configuration prevents debris above a certain size from entering the opening 115 during operation. Notably, as illustrated in FIG. 5 and FIGS. 8A-8D, the backpack blower 100 is shown relative to a coordinate system along the (x) axis, (y) axis and (z) axis. The longitudinal center of gravity of the backpack blower 100 is represented along the (x) axis, the lateral center of gravity of the backpack blower 100 is represented along the (y) axis, and the vertical center of gravity is represented along the (z) axis.

Figure 4B:
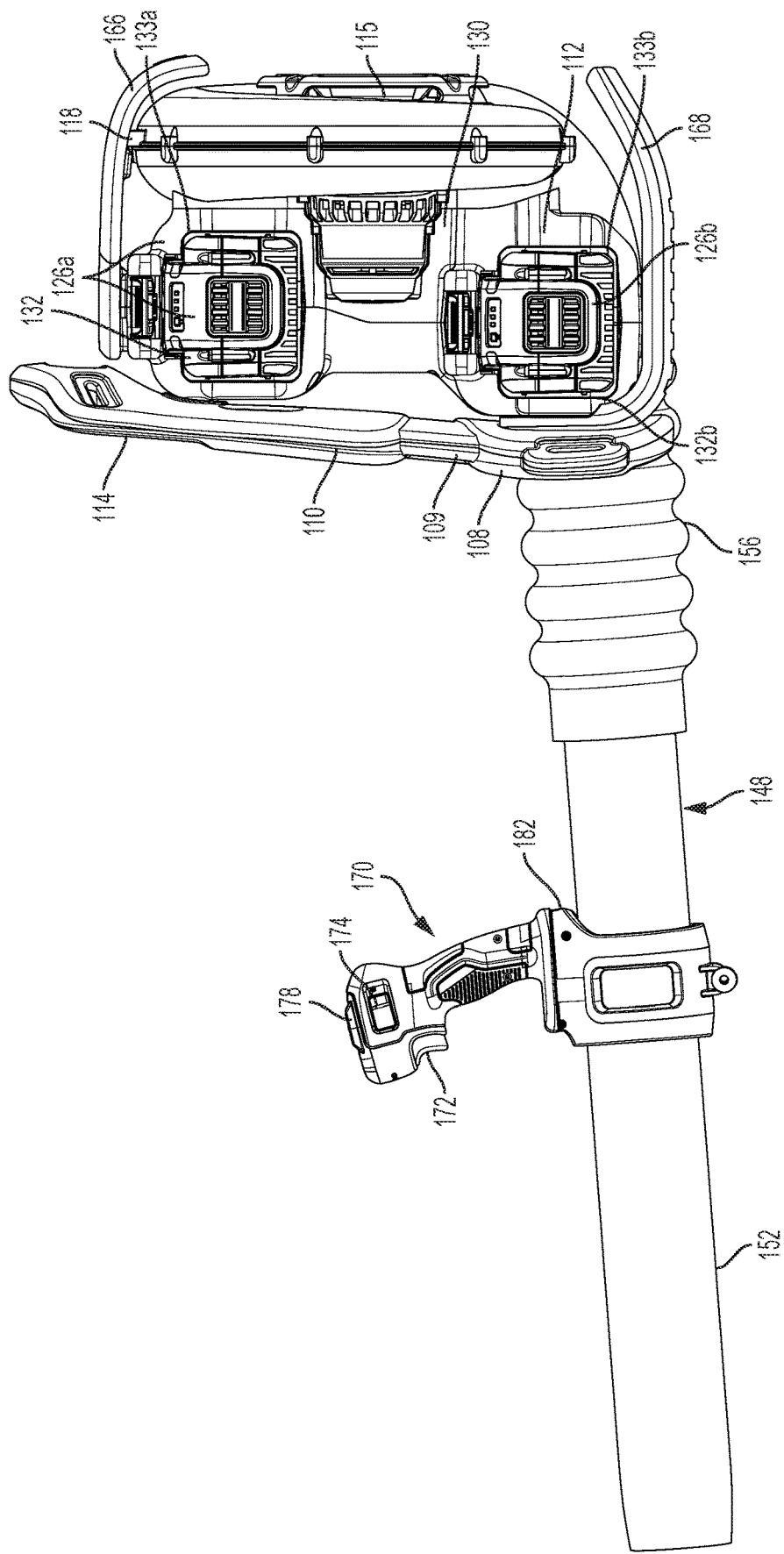
FIG. 4B is a side view of the battery-powered backpack blower illustrating a housing assembly intermediately positioned between a back support assembly and the volute assembly.

As shown in FIGS. 3, 4A-4B, the housing assembly 112 is positioned intermediate to the back support assembly 114 and the volute assembly 118. As depicted in FIG. 3, the housing assembly 112 generally includes a first housing portion 124 and a second housing portion 128 which cooperatively form the housing assembly 112. As such, the housing assembly 112 may be fixedly secured to the top plate portion 110 and lower plate portion 108 of the back support assembly 114.

The housing assembly 112 generally includes one or more battery wells, which may include a top well 132a and a bottom well 132b, configured to receive and support one or more respective batteries 126a and 126b therein. Notably, the housing assembly 112 may also be configured to include only one battery well for receiving only one battery. Conversely, the housing assembly 112 may provide more than two battery wells to support multiple batteries.

As illustrated, battery wells 132a, 132b provide openings 133a, 133b positioned generally on the same side of the housing assembly 112, thereby facilitating the insertion of the respective batteries 126a, and 126b. Notably, it is contemplated that the battery wells 132a, 132b and respective openings 133a, 133b may be provided in virtually any configuration, including with each respective battery well 132a, 132b provided on opposing sides of the housing assembly 112.

As illustrated in FIG. 3, the first housing portion 124 is configured for fastenable engagement with the back plate member 106, and a second housing portion 128 is configured for fastenable engagement with the volute assembly 118. The housing assembly 112 further includes a motor chamber 130. The motor chamber 130 is positioned vertically intermediate to the first battery well 132a and second battery well 132b and configured to receive and support a motor assembly 138 therein. As shown, electronic components are also positioned in the first cavity 130. The electrical components may include a controller 180 (shown in FIG. 3), which may be programmed to receive a signal from a joystick-like control assembly 170 (shown in FIG. 4B) to control a motor 150 and power distribution from the respective batteries 126a, 126b.

The motor assembly 138 generally includes a motor 150 and motor case 162 configured to contain the motor 150. The motor assembly 138 further includes a belt drive system 144 (as shown in FIGS. 6A-6D), and a pulley housing 164 configured to contain a second pulley 146. As shown in FIGS. 6A-6D, the battery-powered backpack blower 100, the motor 150 is operatively connected to the fan member 134 to provide rotation thereto. The motor assembly 138 may be positioned in the motor chamber 130 of the housing assembly 112. The electric motor 150 is operatively connected to a belt drive system 144. The belt drive system 144 generally includes a first or motor drive shaft member 161 having a first pulley 147 operatively connected to the motor 150. A belt 142 operatively connects the first pulley 147 to the second pulley 146, which is connected to a second shaft member 160 of the fan member 134. As such the first pulley 147 and second pulley 146 engage the belt 142 to drive the belt drive system 144.

In another embodiment, the first pulley 147 and/or second pulley 146 may each have teeth and the belt 142 may have ridges. As such, the first pulley 147 and second pulley 146 engages ridges provided on the belt 142, in order to drive the belt drive system 144. Operation of the motor assembly 138 is controlled by the control assembly 170 via the controller 180. Further details regarding the operation of the control assembly 170 and controller 180 will be further discussed later herein FIGS. 5 and 6A-6D further illustrate the motor assembly 138 positioned horizontally within the motor chamber 130. By placing the motor assembly 138 and respective battery assemblies 126a, 126b close to the back plate 106, user comfort is improved as described above.

Figure 6A:
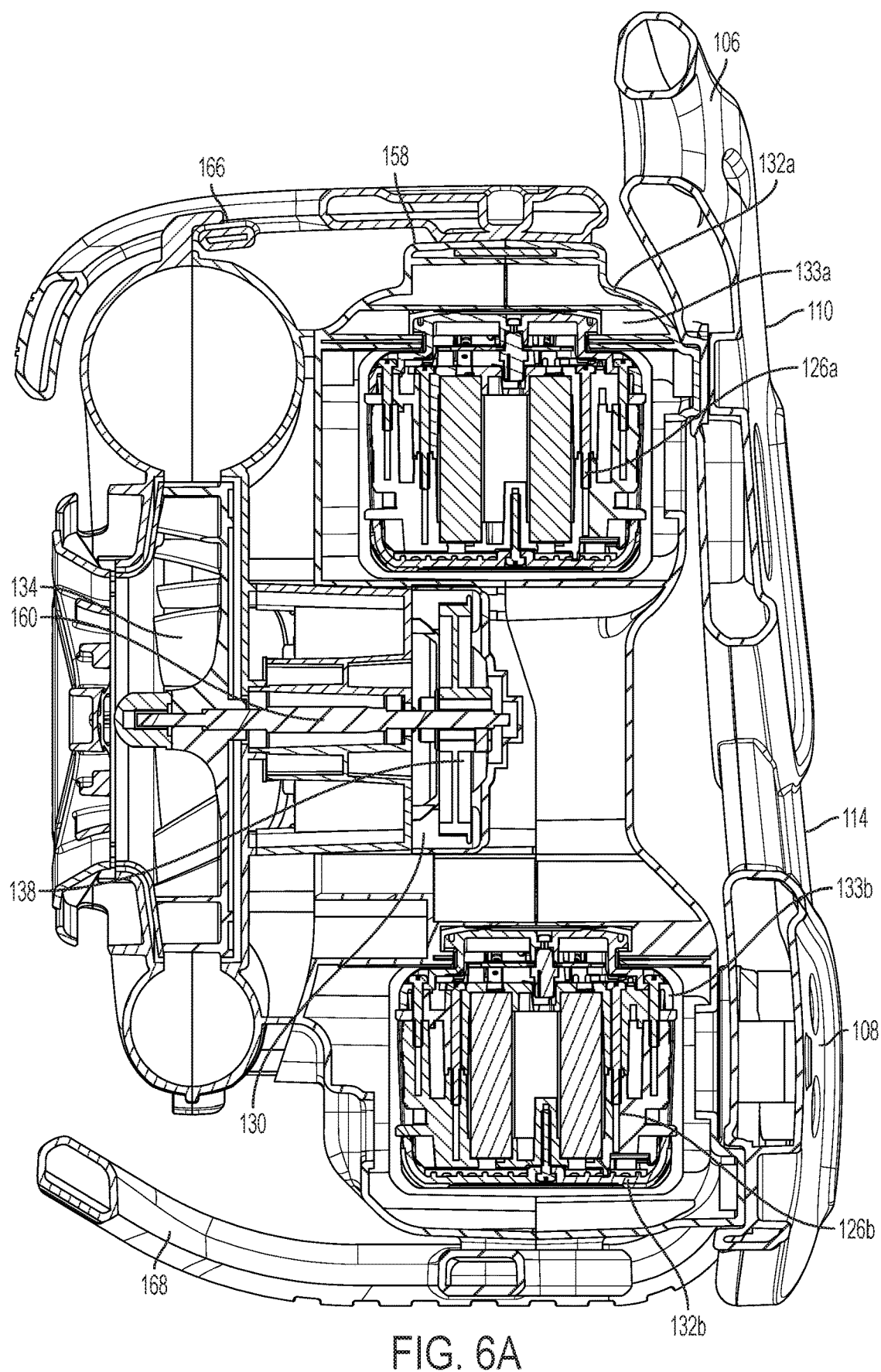
FIG. 6A is a side sectional view of the battery-powered backpack blower illustrating the relationship between the housing assembly and the volute assembly.
Figure 6B:
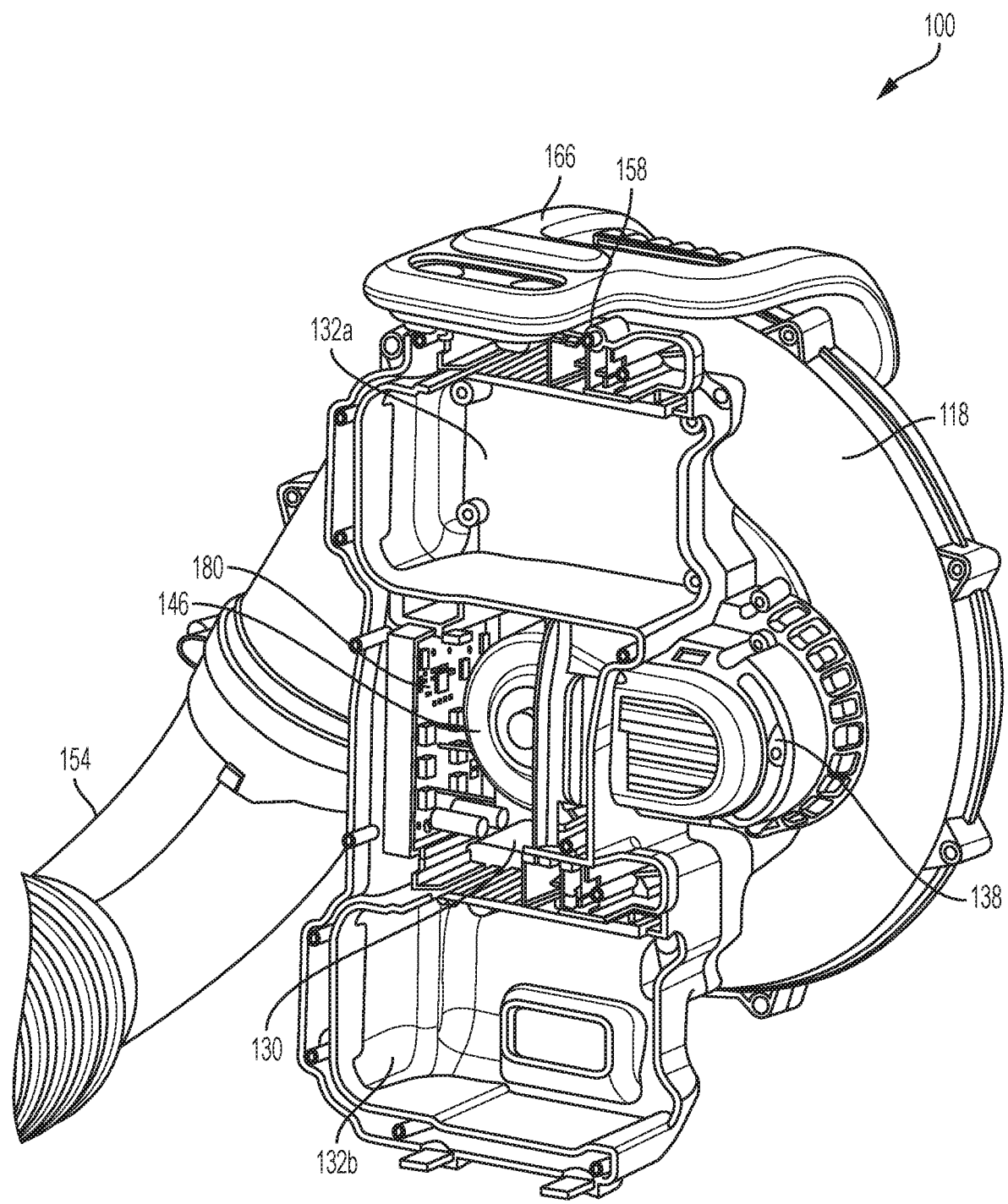
FIG. 6B is a perspective sectional view of the battery-powered back pack blower illustrating the relationship between the motor assembly and electrical components.
Figure 6C:
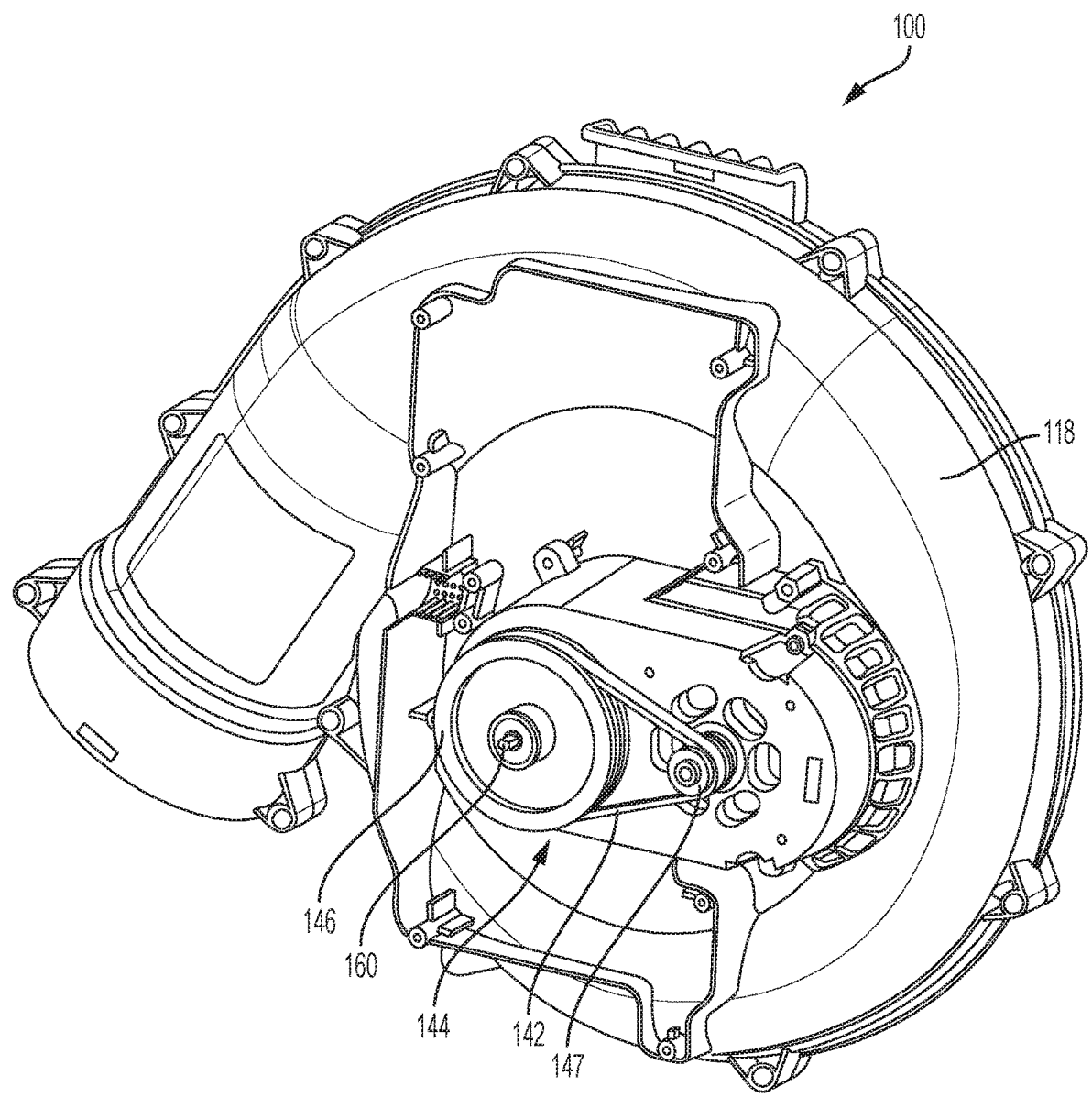
FIG. 6C is a perspective sectional view of the housing assembly of the battery-powered backpack blower, illustrating the positioning of the motor assembly and belt drive system.
Figure 6D:
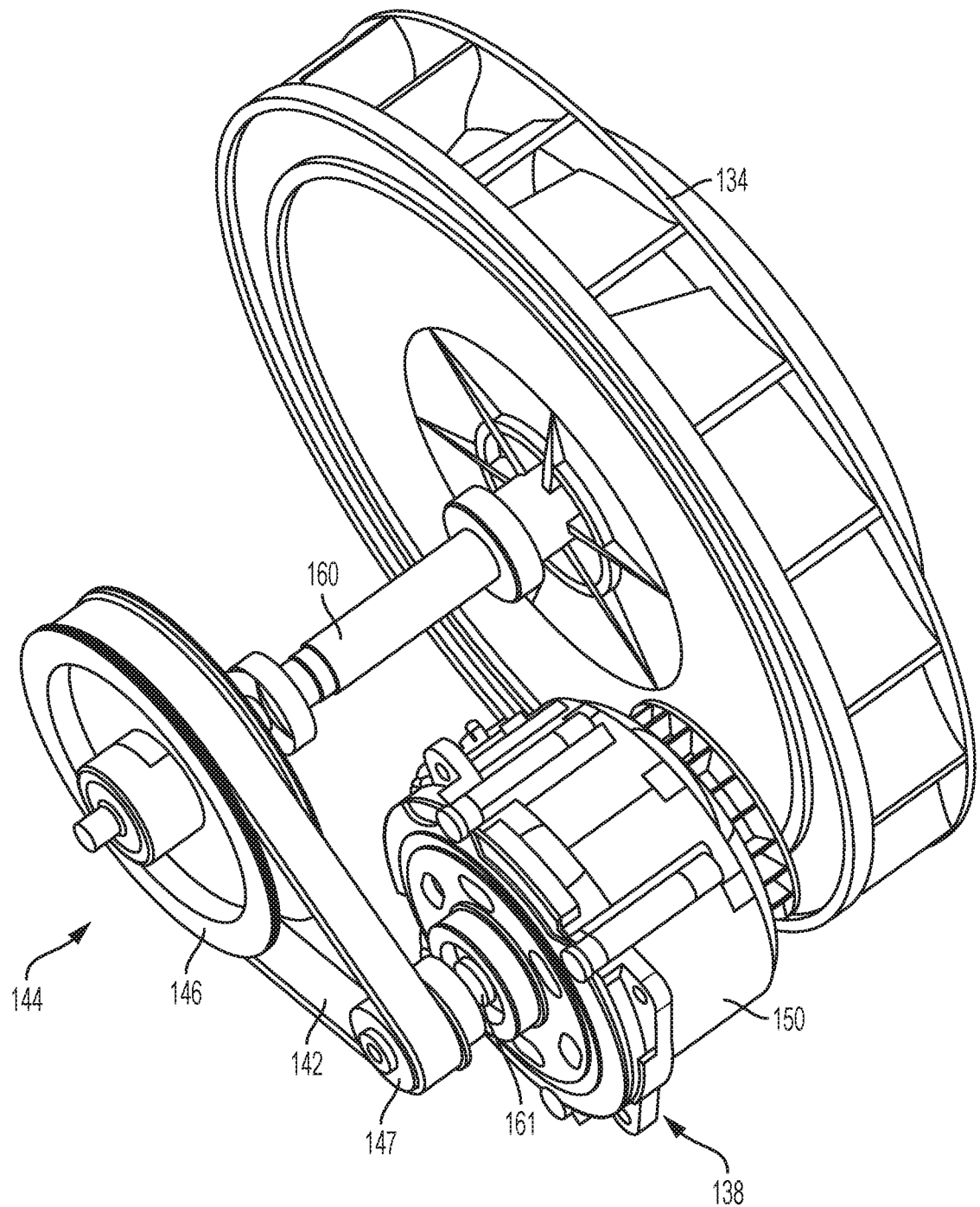
FIG. 6D is a perspective view of the motor and belt drive system of the battery-powered backpack blower.

FIGS. 1B and 6A shows the backpack blower 100 further includes a top guard plate 166, which is removably connectable to a top portion 158 of the housing assembly 112, which is the assembly of housing portions 124 and 128. Additionally a floor plate 168 is removably connectable to a bottom portion of the back plate 106 at the lower plate portion 108 and attached to the housing assembly 112 first housing portion 128 and second housing portion 124.

Figure 7:
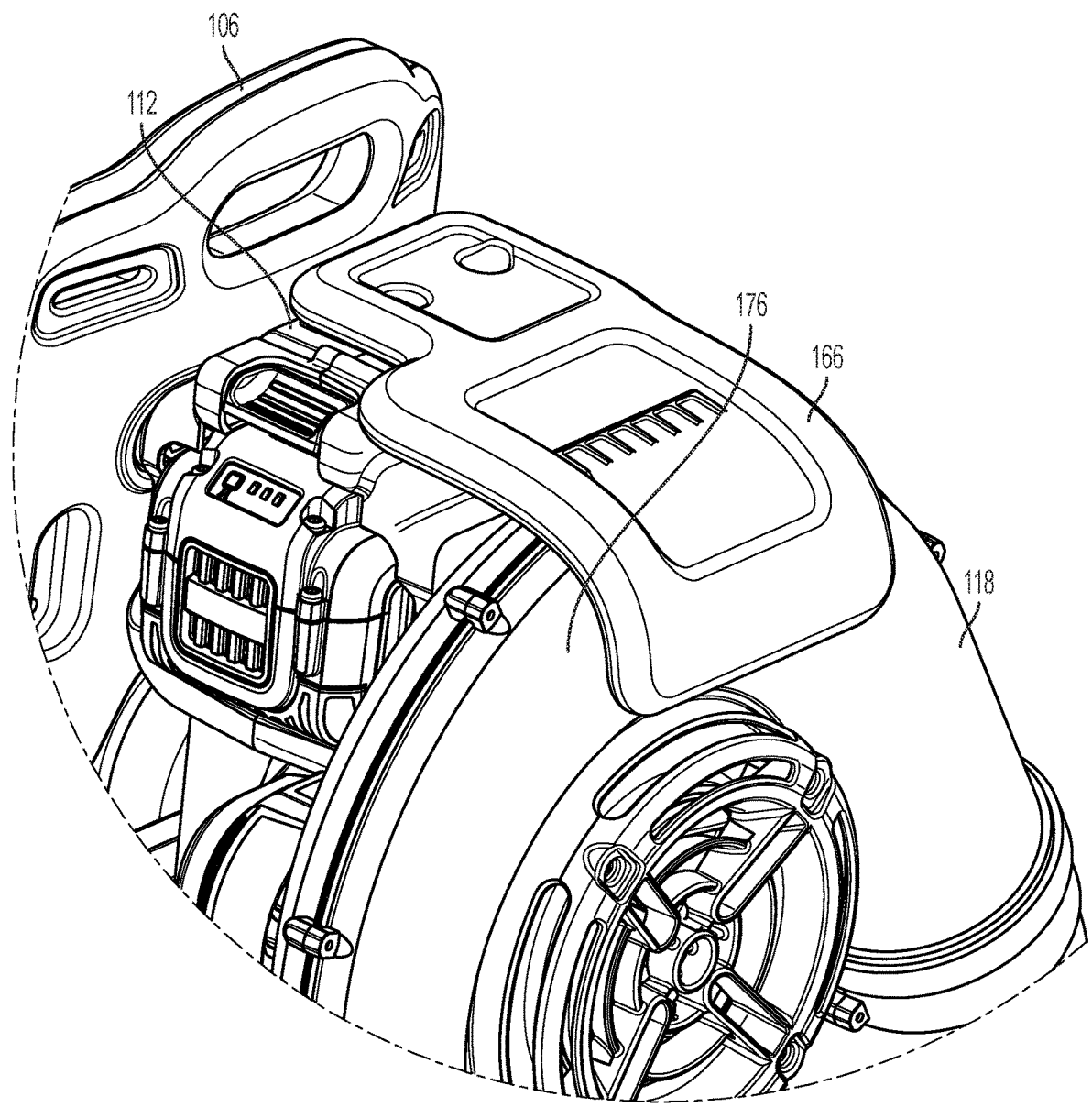
FIG. 7 is detailed view of the top guard plate affixed to the housing assembly of the battery-powered backpack

As shown in detail in FIG. 7 the top guard plate 166 is configured to cover a top portion of the housing assembly 112, as well as the volute assembly 118. The top guard plate 166 and floor plate 168 cooperatively provide a protective barrier for the housing assembly 112 such that in cases in which the blower 100 is dropped or otherwise thrown around during transport and storage, the housing assembly 112 and volute assembly 118 and intake cover 136 are not damaged. As shown, the top guard plate extends generally outward over the housing assembly 112 and volute assembly 118, and curves in a generally downward to protect the top portion 176 of the volute assembly 118 in the event that the backpack blower 100 is accidentally dropped. As shown, the top guard plate 166 may be removably connected to a top portion of the housing assembly 112, permitting a user to replace the top guard plate 166 in cases in which the top guard plate 166 is damaged. Notably, it is contemplated that the top guard plate 166 may also be integrally formed with the housing portion 112.

In addition to providing protection, the floor plate 168 also provides a convenient base for supporting the battery-powered backpack blower 100 in an upright position when placed on a surface, such as the ground or a table, for example. Similar to the top guard plate, the floor plate 168 may be formed integrally with the back plate 106 or housing assembly 112, or may be formed separately and attached to the back plate 106 for easy replacement in the event of damage or wear and tear. The top guard plate 166 and floor plate 168 both may extend beyond the volute assembly 118 to cooperatively provide additional protection to the volute assembly 118. For example, if the battery-powered backpack blower 100 is placed with the volute assembly 118 down, the top guard plate 166 and floor plate 168 protect the volute assembly 118 and supports the battery-powered backpack blower 100.

Figure 8A:
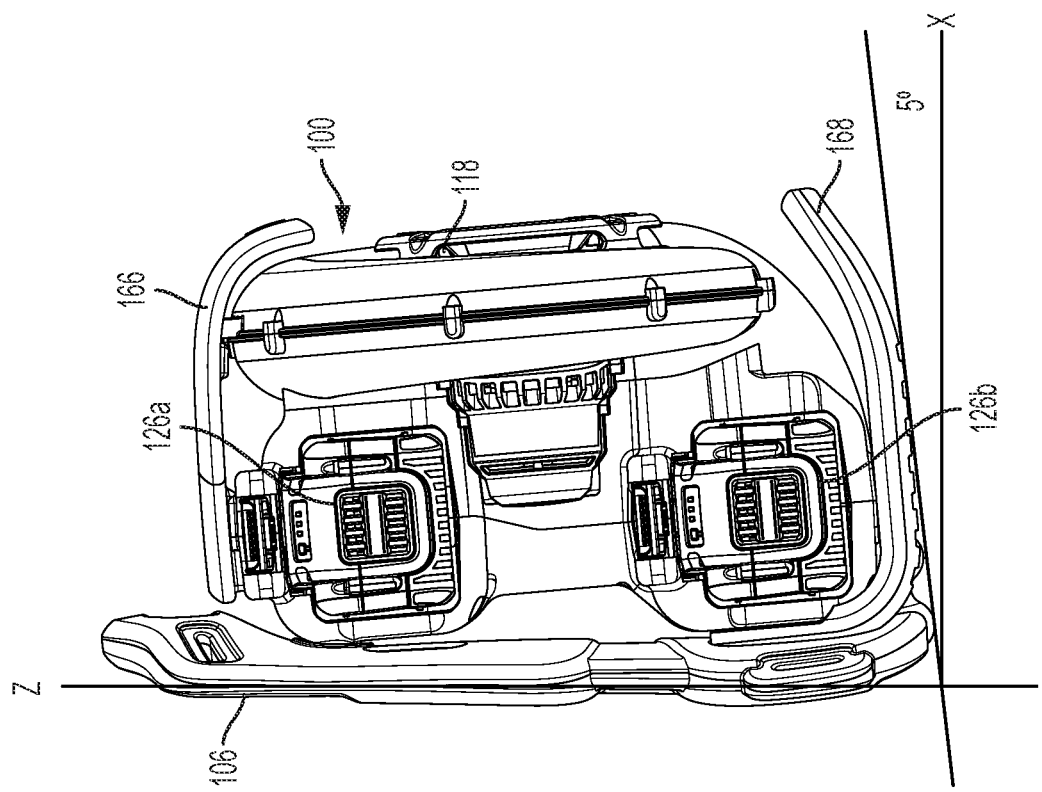
FIG. 8A is a side view of the battery-powered backpack blower illustrating the weight balance of the blower on the ground.
Figure 8B:
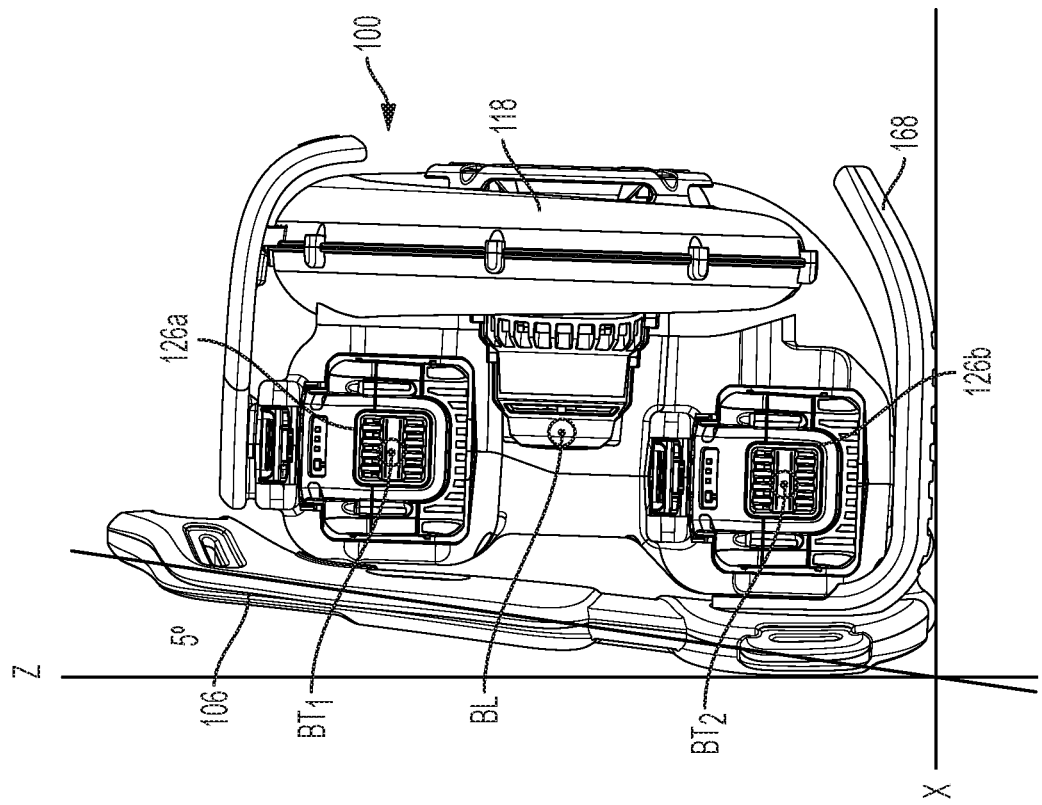
FIG. 8B is a side view of the battery-powered backpack blower depicted on the back of a user.

Positioning the battery and motor proximate to the user's back provides several advantages. One advantage of this configuration is that torque forces acting on the user are reduced. FIGS. 8A and 8B illustrate the weight of the back pack blower acting on the user's back and shoulders due to gravitational forces and the moment forces (FM) which would tend to pull the blower away from the user's back. The heaviest components of the battery-powered backpack blower 100 are the batteries 126a, 126b and the motor 150 that are located adjacent the back plate 106 so that moment forces are reduced. As shown in FIG. 8B, when the backpack blower 100 is worn by a user, the batteries line up against the user's back to position the batteries as close to the user as possible and reduce the forces acting on the user's back as discussed above. This means that it is beneficial to have the distance of the center of gravity of the backpack blower 100 from the user's back in the x direction to be as small as possible.

Now referring to FIG. 8A when the battery-powered backpack blower 100 is placed on the ground or other flat surface, the back plate 106 may be angled from the vertical. With the angled back plate 106, the two batteries 126a and 126b are not directly aligned with one another vertically, but rather the top battery 126a is further rearward longitudinally towards the volute assembly 118 than the lower battery 126b, which is closer to the back plate 106. This offset configuration moves the weight of the overall blower 100 rearward slightly in this configuration, which helps to prevent the backpack blower 100 from tipping forward when sitting on a relatively flat surface.

As shown in FIG. 8B, when the battery-powered backpack blower 100 is placed on a user's back, the floor plate 168 is positioned at approximately 5 degrees relative to the (x) axis.

Further as shown in FIG. 8A, the center of gravity (CoG) of the backpack blower 100 including the two batteries 126a, 126b is approximately 140 millimeters from the user's back in the direction of the (x) axis. Further, the center of gravity of the back pack blower 100 including the two batteries 126a, 126b is approximately 230 millimeters from the bottom of the back pack blower 100 in direction of the (z) axis. Notably, all of the center of gravity (CoG) measurements represented herein, with respect to the battery-powered backpack blower 100, do not include attachment of the tube assembly 148 to the backpack blower 100.

As further illustrated, another advantage of the housing assembly 112 and battery 126 configuration is that by positioning one battery 126 or, in a dual battery configuration both batteries 126a, 126b, horizontally and generally central with respect to the back plate 106, the mass of the battery 126 or batteries 126a, 126b is spread horizontally across the width of the backpack blower 100. This is true in both a single and dual battery configuration. Notably, the lateral center of gravity is at BL as shown in FIG. 5, and the addition of one or two batteries results in the lateral locations of BL staying the same. In a single battery configuration, the battery's lateral center of gravity is aligned with the lateral location of BL. In a dual battery configuration, both batteries 126a, 126b lateral center of gravity are aligned with the lateral location of BL. Further as shown in FIG. 8A, the center of gravity of the respective batteries $BT_1$ and $BT_2$ are provided close to the user's back in the direction of the x-axis, reducing torque forces acting on the user.

The center of gravity of the battery 126a, as indicated at $BT_1$, is approximately 128 millimeters from a lower outer edge of the back plate 106 relative to the (x) axis. The center of gravity of the battery 126a, as also indicated at $BT_1$, is approximately 330 millimeters from the lower edge of the floor plate 168 relative to the (z) axis. The center of gravity of the battery 126b, as indicated at $BT_2$, is approximately 116 millimeters from the lower outer edge of the back plate 106 relative to the (x) axis. The center of gravity of the battery 126b, as also indicated at $BT_2$, is approximately 89 millimeters from the lower edge of the floor plate 168 relative to the (z) axis.

As illustrated in FIG. 5, the center of gravity along the y-axis, at BL is located substantially in the center of the battery-powered backpack blower 100 in the lateral direction. The central location of BL permits a user to support the blower 100 on his/her back without torque forces from the blower 100 pulling the user in a particular direction.

While specific measurements are provided regarding the center of gravity for the battery-powered backpack blower 100, it is further contemplated that other center of gravity locations for the backpack blower 100 may result as the configuration of the backpack blower 100 varies. While positioning the batteries and the electric motor, which are generally the heaviest components of the backpack blower 100, close to the user's back provides the benefit of greater user comfort, because the overall center of gravity of the backpack blower 100 is closer to the user. Further, because the two batteries are positioned to extend generally horizontally across the user's back, the battery weight is distributed relatively evenly on each of the user's shoulders and back. As such, this maintains the lateral center of gravity of the battery-powered backpack blower 100 generally in the same location, regardless of whether there are zero, one, or two batteries inserted in the battery-powered backpack blower 100. The location of the batteries and the electric motor results in the volute and fan member being positioned generally at the rear of the battery-powered backpack blower 100 farthest from the user. As the volute and the fan member are among the lighter components, this allows for the center of gravity of the battery-powered backpack blower 100 to be closer to the user. Further, in this arrangement, a larger air intake area for the volute is possible resulting in greater airflow. In summary, a battery-powered backpack blower configuration with the electric motor and batteries nearest the back of the user, with the batteries extending horizontally, and the volute and fan member located farthest from the back of the user provides the beneficial center of gravity described herein, as well as improving air flow into the battery-powered backpack blower 100.

As shown in FIGS. 1A, 3 and 4B, the backpack blower 100 further include a tube assembly 148, which is operatively connected to the volute assembly 118 and receives air flow therefrom. The tube assembly 148 generally includes one or more detachable tube members 152 having an elongated configuration, a flexible member 156, providing the user the flexibility to move and point the end portion of the tube member 152 to direct the air flowing out of the tube member 152.

Figure 9:
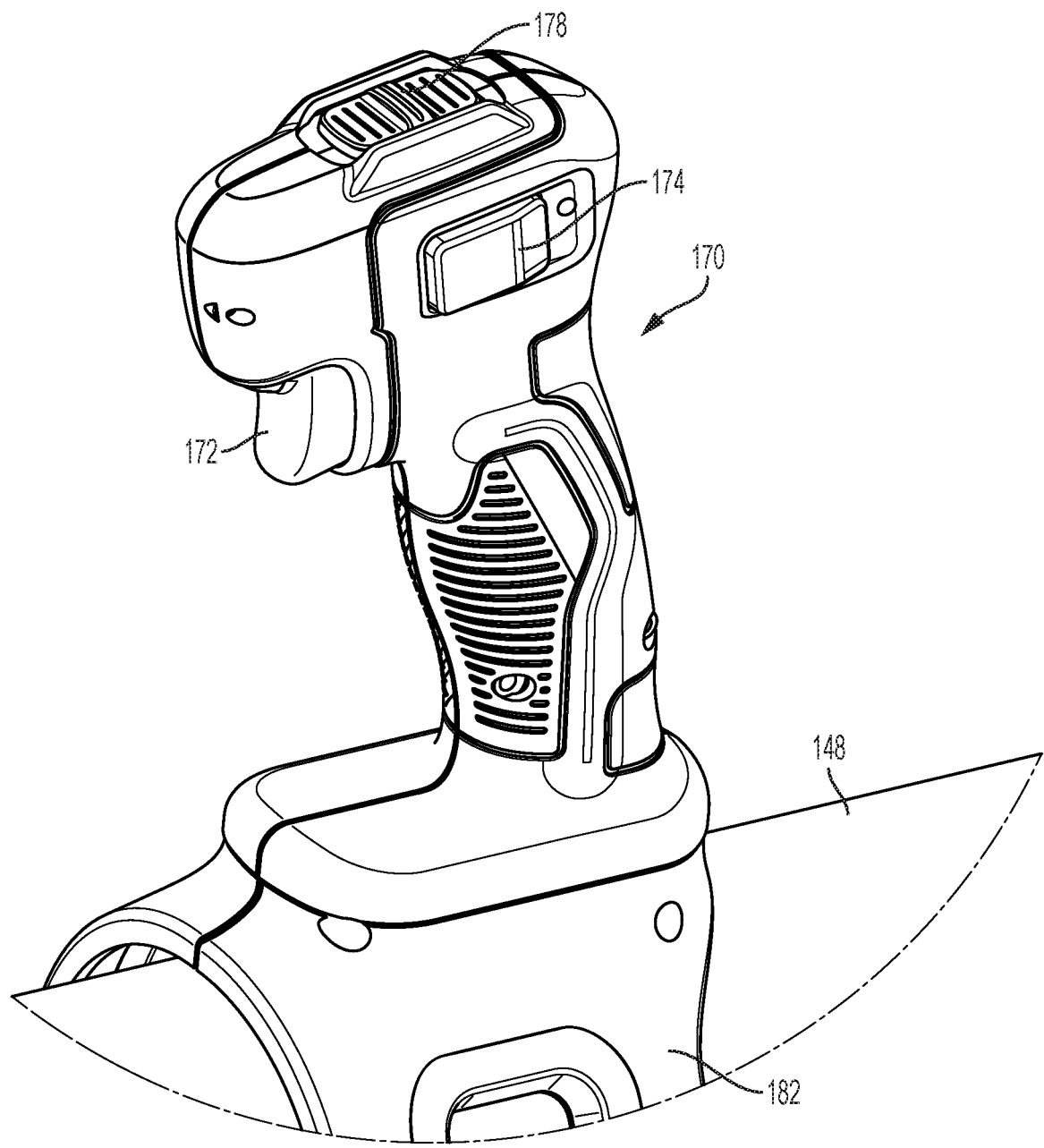
FIG. 9 is a detailed view of a trigger mechanism of the battery-powered backpack blower.

As illustrated, the tube assembly 148 is positioned to travel along the housing assembly 112 on a side opposing the openings for the battery wells 132a, 132b. It is however contemplated that the tube assembly 148 may be provided on either side of housing assembly 112 of the blower 100. The battery-powered backpack blower 100 further includes a control assembly 170 which permits a user to control the overall operation of the battery-powered backpack blower 100, including the speed of the fan member 134. As illustrated, the control assembly 170 may be connected directly to the tube assembly 148 using a cuffing member 182 which attaches around the tube member 152. As shown in detail in FIG. 9, the control assembly 170 generally includes a variable speed trigger 172 and a momentary switch member 174 in communication with the controller 180.

The variable speed trigger 172 allows the user to operate the motor 150, and thus the blower 100, at selected speeds. By depressing the trigger 172, a signal is sent to the controller 180 causing the motor 150 to move at the selected speed. To set the blower 100 at that selected speed, the user then pushes or engages the momentary switch member 174, which sends a signal to the controller 180 locking the motor 150 at that selected set speed.

If the user wishes to increase the speed from the set speed, the user may further depress/engage the trigger 172, and the speed of the motor 150 and fan increases until the trigger 172 is released. Upon release of the trigger 172, the motor 150, fan and blower return to the selected set speed until the momentary switch is disengaged, turning off the speed control. One advantage of this setup is that it is easy for the user to control, and it is intuitive as it functions very similar to that of a car cruise control, which many users will be familiar with. Notably the user may also operate the battery-powered blower at a selected speed by depressing and holding the trigger 172 at a selected position As shown the control assembly 170 also includes a battery control switch 178 provided thereon. The battery control switch 178 is in communication with the controller 180 and is provided to permit the user to selectively switch between the batteries 126a, 126b, in the event that one of the batteries were to run out of charge or malfunction.

Non-limiting examples of how the electronics control the batteries are provided herewith. The electronic components include a controller 180 which directs the one or more batteries 126a, 126b, upon user prompt at the control assembly 170, to provide electricity to the motor assembly 138. In one embodiment, the controller 180 may be programmed such that only a single battery 126 is delivering power to the motor assembly 138 at any time. The advantage of this mode of operation is that it allows a user to reduce the weight of the battery-powered backpack blower 100 by inserting only a single battery 126a, 126b at a time. If the user desires to operate with an extended runtime, he or she may insert both batteries 126a, 126b. Further, once one of the batteries 126 becomes low on power, the user via the controller 180 may engage a battery selector to switch to between the batteries.

In another embodiment, the battery wells 132a, 132b may each include sensors that detect the presence of the respective batteries 126a, 126b and send a signal to the controller 180. As such, the controller 180 selectively receives power from whichever battery is present in its respective battery well 132a 132b.

In another embodiment, the backpack blower 100 may include one or more sensors to detect the power levels of the respective batteries 126a, 126b and send a signal to the controller 180. As such, the controller 180 may select which of the batteries 126a, 126b to receive power from, based on the respective detected power levels of the batteries 126a, 126b.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for using a backpack blower, comprising the steps of:
    providing a blower having a backplate, a volute assembly for providing an air flow pathway through the blower, a fan member to generate air flow through the volute assembly, a motor secured to the volute assembly and operatively connected to the fan member, the motor being powered by at least one battery, a first battery well configured to receive a first battery and a second battery well, spaced from the first battery well, configured to receive a second battery;
    inserting the first battery into the first battery well and inserting the second battery into the second battery well; and
    placing the blower on a user's back for use.

2. The method of claim 1, wherein the motor is located between the first battery well and the second battery well.

3. The method of claim 1, wherein the first battery well is disposed above the second battery well.

4. The method of claim 1, wherein the volute assembly is disposed substantially parallel with the backplate.

5. The method of claim 1, wherein the first and second batteries are inserted through a side of the blower.

6. The method of claim 1, further comprising the step of providing a control assembly with a trigger to control power to the motor; and
    depressing the trigger to provide power to the motor.

7. A method of operating a backpack blower, comprising the steps of:
    providing a blower with a backplate defining a first plane, a harness attached to the backplate, a volute assembly for providing an air flow pathway through the backpack blower, the volute assembly lying in a second plane, wherein the first plane and the second plane are substantially parallel, a motor operatively connected to a fan member, the motor being powered by at least one battery, a fan member to generate air flow through the volute assembly, and a first battery well to hold a first battery;

inserting the first battery into the first battery well; and placing the blower on a user's back.

8. The method of claim 7, wherein the blower has a second battery and a second battery well, further comprising the step of inserting the second battery into the second battery well.

9. The method of claim 8, wherein a vertical axis going through a first battery center of gravity and a vertical axis going through a second battery center of gravity do not lie in the same plane.

10. The method of claim 7, wherein the volute assembly has an air intake facing a rearward direction.

\* \* \* \* \*